United States Patent [19]
Turner

[11] Patent Number: 4,849,968
[45] Date of Patent: Jul. 18, 1989

[54] BUFFER MANAGEMENT SYSTEM

[75] Inventor: Jonathan S. Turner, University City, Mo.

[73] Assignee: Washington University, St. Louis, Mo.

[21] Appl. No.: 164,020

[22] Filed: Mar. 4, 1988

Related U.S. Application Data

[63] Continuation-in-part of Ser. No. 773,380, Sep. 6, 1985, Pat. No. 4,734,907.

[51] Int. Cl.$^4$ .......................... H01Q 11/04; H04J 3/26
[52] U.S. Cl. .......................................... 370/94; 370/60
[58] Field of Search ............................ 370/60, 94, 89; 340/825.5, 825.51

[56] References Cited

U.S. PATENT DOCUMENTS

| | | | |
|---|---|---|---|
| 4,321,703 | 3/1982 | Schwaertzel et al. | 370/89 |
| 4,399,531 | 8/1983 | Grande et al. | 370/60 |
| 4,484,326 | 11/1984 | Turner | 370/60 |
| 4,486,877 | 12/1984 | Turner | 370/15 |
| 4,488,288 | 12/1984 | Turner | 370/60 |
| 4,488,289 | 12/1984 | Turner | 370/60 |
| 4,490,817 | 12/1984 | Turner | 370/17 |
| 4,491,945 | 1/1985 | Turner | 370/60 |
| 4,494,230 | 1/1985 | Turner | 370/60 |
| 4,516,238 | 5/1985 | Huang et al. | 370/60 |
| 4,566,095 | 1/1986 | Devault et al. | 370/60 |
| 4,769,810 | 9/1988 | Eckberg, Jr. et al. | 370/60 |
| 4,769,811 | 9/1988 | Eckberg, Jr. et al. | 370/60 |

OTHER PUBLICATIONS

Huang et al, "Starlite: A Wideband Digital Switch," Globecom 84, pp. 121-125.
Jenq, "Performance Analysis of a Packet Switch Based on Single-Buffered Banyan Network", *IEEE Journal on Selected Areas in Communications*, vol. SAC-1, Dec. 1983, pp. 1014-1021.
Feng, "A Survey of Interconnection Networks", *Computer*, vol. 14, No. 12, Dec. 1983, pp. 12-27.
Montgomery, "Techniques for Packet Voice Synchronization" *IEEE Journal on Selected Areas in Communications*, vol. SAC-1, No. 6, Dec. 1983, pp. 1022-1028.
Hoberecht, "A Layered Network Protocol for Packet Voice and Data Integration", *IEEE Journal on Selected Areas in Communications*, vol. SAC-1, No. 6, Dec. 1983, pp. 1006-1013.
Turner et al "A Packet Network Architecture for Integrated Services", IEEE 1983.
Turner, "Design of an Integrated Services Packet Network", Washington University Computer Science Department, Technical Report, WUCS-85-3.
Akhtar, "Congestion Control in a Fast Packet Switching Network", Washington University Sever Institute of Technology, A Thesis, Dec., 1987.

*Primary Examiner*—Douglas W. Olms
*Attorney, Agent, or Firm*—Rogers, Howell, Moore & Haferkamp

[57] ABSTRACT

A Buffer Management System for a general multipoint packet switching network where the network has terminals transmitting data in the form of packets belonging to multiple channels over communication links through a packet switch array, the packet switches of the array receiving incoming packets from input data links and having memory arrays for temporarily storing the incoming packets for retransmitting the stored packets over output links. The Buffer Management System determines whether a packet should be stored, retransmitted, or discarded during an overload condition by identifying each incoming packet as either an excess packet or a nonexcess packet based on the number of packets stored in the memory array of the same channel as the incoming packet, and writing an incoming nonexcess packet into the memory array when the memory array is full and at least one excess packet is in the memory array and for discarding the excess packet from the memory array.

16 Claims, 7 Drawing Sheets

STATUS

MEMORY ARRAY

|   | 7 | 6 | 5 | 4 | 3 | 2 | 1 | 0 |
|---|---|---|---|---|---|---|---|---|
| DP | 0 | 1 | 1 | 1 | 1 | 1 | 1 | 1 |
| EX | - | 1 | 0 | 1 | 0 | 0 | 0 | 0 |
| CH | - | 19 | 14 | 12 | 20 | 13 | 12 | 17 |
| COL | 2 | 7 | 1 | 0 | 4 | 5 | 6 | 3 |

| 7 | 6 | 5 | 4 | 3 | 2 | 1 | 0 |
|---|---|---|---|---|---|---|---|
| 19 | 12 | 13 | 20 | 17 | - | 14 | 12 |

READ ⇒ CH=17, COL=3

| 0 | 0 | 1 | 1 | 1 | 1 | 1 | 1 |
|---|---|---|---|---|---|---|---|
| - | - | 1 | 0 | 1 | 0 | 0 | 0 |
| - | - | 19 | 14 | 12 | 20 | 13 | 12 |
| 3 | 2 | 7 | 1 | 0 | 4 | 5 | 6 |

| 7 | 6 | 5 | 4 | 3 | 2 | 1 | 0 |
|---|---|---|---|---|---|---|---|
| 19 | 12 | 13 | 20 | - | - | 14 | 12 |

WRITE TO AVAIL. COL. - EX=0, CH=15 ⇒ COL=2

| 0 | 1 | 1 | 1 | 1 | 1 | 1 | 1 |
|---|---|---|---|---|---|---|---|
| - | 0 | 1 | 0 | 1 | 0 | 0 | 0 |
| - | 15 | 19 | 14 | 12 | 20 | 13 | 12 |
| 3 | 2 | 7 | 1 | 0 | 4 | 5 | 6 |

| 7 | 6 | 5 | 4 | 3 | 2 | 1 | 0 |
|---|---|---|---|---|---|---|---|
| 19 | 12 | 13 | 20 | - | 15 | 14 | 12 |

WRITE TO AVAIL. COL. - EX=0, CH=12 ⇒ COL=3

| 1 | 1 | 1 | 1 | 1 | 1 | 1 | 1 |
|---|---|---|---|---|---|---|---|
| 0 | 0 | 1 | 0 | 1 | 0 | 0 | 0 |
| 12 | 15 | 19 | 14 | 12 | 20 | 13 | 12 |
| 3 | 2 | 7 | 1 | 0 | 4 | 5 | 6 |

| 7 | 6 | 5 | 4 | 3 | 2 | 1 | 0 |
|---|---|---|---|---|---|---|---|
| 19 | 12 | 13 | 20 | 12 | 15 | 14 | 12 |

WRITE TO EXCESS COL. - EX=0, CH=18 ⇒ CH=19, COL=7

| 1 | 1 | 1 | 1 | 1 | 1 | 1 | 1 |
|---|---|---|---|---|---|---|---|
| 0 | 0 | 0 | 0 | 1 | 0 | 0 | 0 |
| 18 | 12 | 15 | 14 | 12 | 20 | 13 | 12 |
| 7 | 3 | 2 | 1 | 0 | 4 | 5 | 6 |

| 7 | 6 | 5 | 4 | 3 | 2 | 1 | 0 |
|---|---|---|---|---|---|---|---|
| 18 | 12 | 13 | 20 | 12 | 15 | 14 | 12 |

FIG. 6.

BUFFER MANAGEMENT SYSTEM

REFERENCE TO RELATED APPLICATION

This application is a continuation-in-part of copending patent application Ser. No. 773,380, filed Sept. 6, 1985, entitled "Broadcast Packet Switching Network", the entirety of which is incorporated herein by reference.

BACKGROUND AND SUMMARY OF THE INVENTION

This invention relates to a buffer management system and more particularly to such a system for a high speed packet network supporting multipoint connections with multiple transmitters operating over channels at different rates. Various techniques have been devised t prevent buffer overload and the loss of data or packets. The present invention is directed to a mechanism for determining which packets are to be discarded in the event of an overload.

One of the principal advantages of packet switching is the ability to support communication channels of any rate across a potentially wide range. Not only can different channels operate at different rates, but the rates of individual channels may vary over time. This latter property leads to the possibility of overload as there may be periods when the total offered traffic exceeds the network's capacity.

In conventional low speed packet networks such overload periods are controlled using a variety of feedback oriented techniques which attempt to detect overload and then apply control mechanisms that reduce the overload In high speed networks, for example, networks that transmit at 100 megabits/sec., these techniques are more difficult to implement and less effective because the onset of overload is very rapid relative to the time it takes to exert control. This has led to the development of control strategies which attempt to limit the likelihood of overload in the first place by allocating network resources based on application requirements and blocking new connections whenever the required resources are unavailable. On those occasions when local overloads occur, the network reacts by discarding packets.

In networks supporting only point-to-point or multipoint connections involving a single transmitter, such overloads can be made to occur rarely enough to obviate the need for additional controls. However in networks supporting general multipoint connections additional mechanisms are needed. The present invention addresses the problem of how a network of this type, having general multipoint connections, selects which packets to discard or drop when an overload occurs.

The buffer management system of the present invention is used in a broadcast packet switching network as generally shown and described in said copending application. The packet switching network generally comprises an array of packet switches, which switches are generally connected by one or more high bit rate data links. Virtual circuits passing through a plurality of packet switches are set up in the network to provide single point as well as multipoint connections. This enables a wide range of commercial services including television distribution and conferencing. The basic switching capability of the network is provided by a packet switching module. The switching modules can be interconnected to form packet switches which, in turn, may be interconnected to form the packet switching network. Such a network is shown and described in said copending application.

As explained in the copending application, each of the switch modules comprises a copy network, a set of broadcast and group translators, a distribution network and a routing network. Broadcast packets are replicated in the copy network. Each copy of a broadcast packet that leaves the copy network is provided with a destination address by one of the broadcast and group translators. The distribution and routing networks then route the packet copies to their destinations. A method for adding or deleting destinations from a given broadcast channel is provided.

Buffers are associated with the packet processors at both the input and output links of the switch fabric. While packets may be buffered at the input links and within the switch fabric itself, in accordance with the buffer management system of the present invention the bulk of the queueing takes place in the output link buffers. Further in accordance with the invention in order to determine which packets are to be dropped in an overload condition, each connection or group of connections, whether single point or multipoint, is allocated a bandwidth, and is further allocated a number of buffer slots in the output link buffer in proportion to the allocated bandwidth. For example, if a given connection or channel is allocated 20% of the bandwidth on a given link, then it is also allocated 20% of the buffer slots in that link's output buffer. If the link buffer is not full then the allocation has no effect. However, if the buffer becomes full, the buffer allocation is used to determine which packets are discarded. Connections using more than their allocated buffer slots lose packets during overload while connections that are operating within their allocation are protected, that is, do not lose packets.

Hence, the system of the present invention generally includes a network associated with each packet processor for identifying or "marking" a packet as an "excess packet" when a packet for a particular connection is received at the output link buffer of that packet processor and the buffer slots allocated to that connection are filled. The system further comprises a buffer implementation network that maintains packet ordering but discards excess packets first in an overload condition. The buffer implementation network includes a memory array or RAM in which the packets are stored in columns, and suitable input and output shift registers for transferring the packets into and out of the memory array. The buffer implementation network further includes a status network that maintains information about the packets stored in each column of the memory array. It supports writing to and reading from the buffer implementation network of the packet processor in a selected order, and also controls the writing to a memory column with a priority depending on whether the incoming packet is or is not an excess packet and further whether or not the memory column is occupied by an excess packet. Hence, with this invention nonexcess packets are protected, nonexcess packets have priority over excess packets, and yet excess packets will be written into the buffer (not dropped) as long as slots are available in the buffer. Once written into memory an excess packet will be transmitted unless the buffer becomes full and a nonexcess packet takes priority.

Hence, a primary advantage of the present invention is that the storage capacity of the output link buffer of each packet processor is most efficiently utilized to receive, store, and transmit packets, and only when overloaded will excess packets be lost with nonexcess packets protected.

DESCRIPTION OF THE DRAWINGS

FIG. 6 is a series of frames to illustrate the operation of the buffer implementation network of FIG. 5;

DETAILED DESCRIPTION OF A PREFERRED EMBODIMENT

Figure 1:
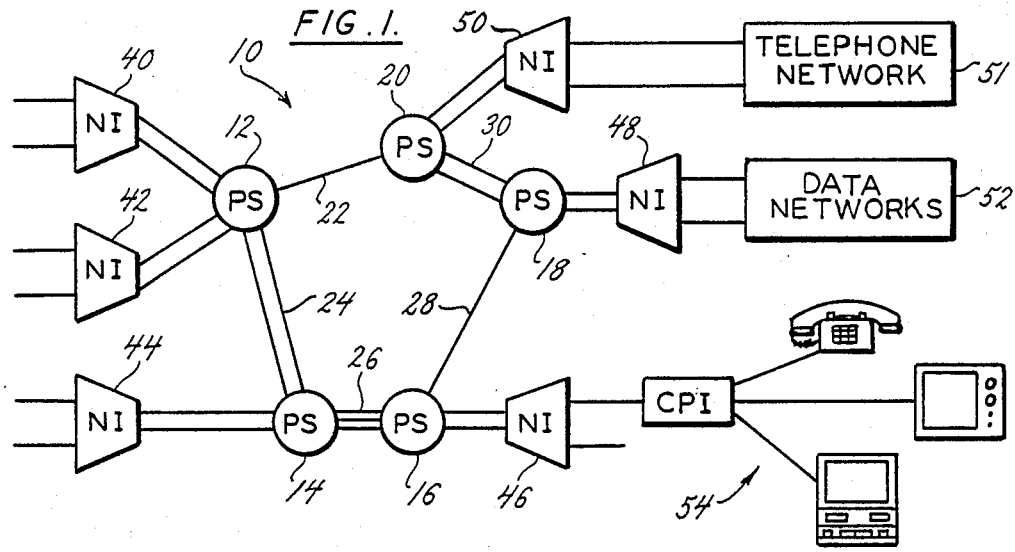
FIG. 1 schematically illustrates a packet switching network having broadcast or multipoint capability with which the buffer management system of the present invention is used.
Figure 2:
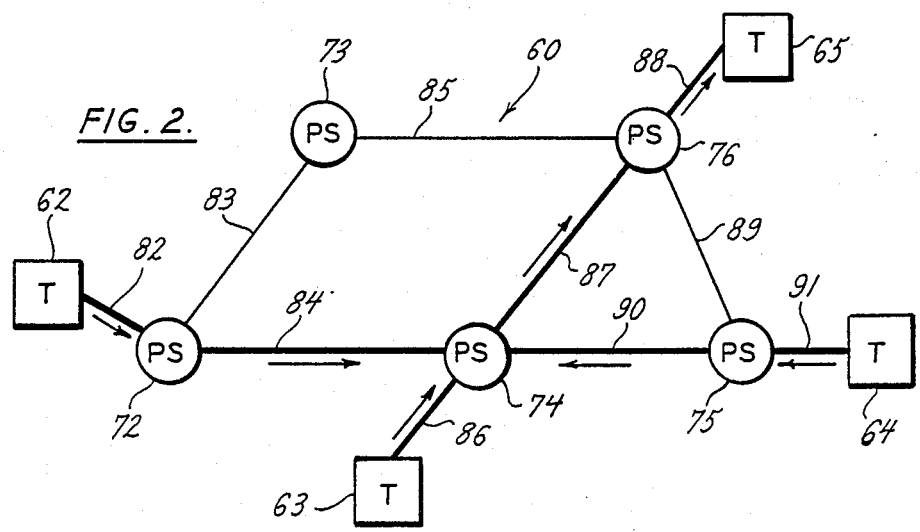
FIG. 2 schematically illustrates a general multipoint packet switching network with multiple transmitters with which the buffer management system of the present invention is used.
Figure 3:
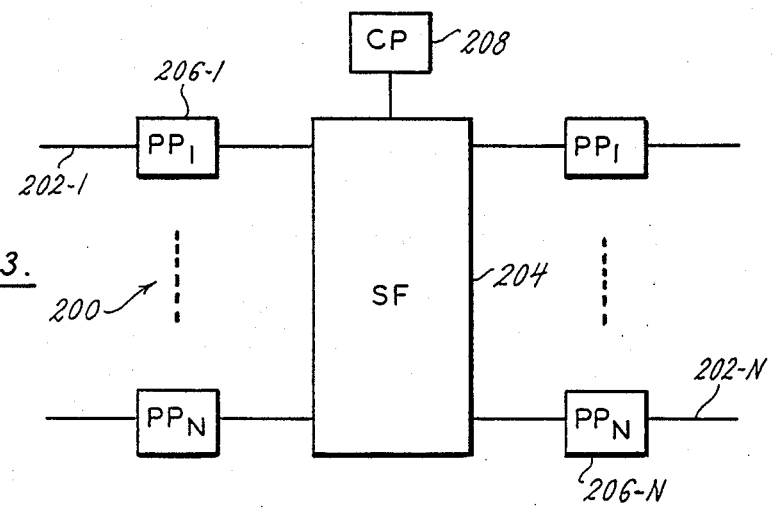
FIG. 3 schematically illustrates a packet switch module for use with the network of FIGS. 1 and 2.

To describe the operation of the buffer management system of the present invention it is useful to describe the environment with which it is used by way of background. FIGS. 1 through 3 of the drawing illustrate this background as depicting a packet switching network having multipoint capability, the buffer management system of the present invention being used with the networks of FIGS. 1 through 3. The networks of FIGS. 1 and 3 are fully described in said copending patent application.

Hence, by way of background, the network 10 comprises an array of packet switches 12, 14, 16, 18, 20 which are illustratively interconnected by one or more high performance data links 22, 24, 26, 2S, 30. The data links are bi-directional fiber optic data links. The fiber optic links have a higher bandwidth capability than conventional non-optical electronic links. Referring to FIG. 1, the packet switches 18 and 16 are connected by a single fiber optic link while the switches 14 and 16 are connected by three fiber optic links. Access to the network is provided by network interfaces 40, 42, 44, 46, 48, 50 which are connected to the packet switches 12, 14, 16, 18, 20 by the way of fiber optic links. The network interfaces serve to interface other networks such as telephone network 51, data network 52 and customer premises equipment 54 with the packet switching network 10.

The network 10 of FIG. 1 provides two main communication services. First, a user may set up a two-way point-to-point channel with any other user. The point-to-point channel is in the form of a virtual circuit which passes through any number of the packet switches 12, 14, 16, 18, 20. Any user may also set up a broadcast or multipoint service that other users are connected to. The method by which such broadcast channels are handled is fully described in said copending patent application.

Thus, the packet switching network 10 can be used to provide voice, data and video communication on a large scale. An important feature of this network 10 is its multipoint capability which makes it suitable for a wide range of applications including television distribution and conferencing.

The basic packet switching capability of the packet switches 12, 14, 16, 18, 20 comprising the network 10 is provided by a high performance switch module. Groups of switch modules may be interconnected to form the packet switches 12, 14, 16, 18, 20 and the network interfaces 40, 42, 44, 46, 48, 50 of FIG. 1.

FIG. 2 further illustrates the background of the invention and shows a packet switching network 60 similar to the network 10 and including a plurality of transmitters 62 through 65, packet switches 72 through 76, and interconnecting links 82 through 91. The network illustrates a general multipoint network whereby multiple transmitters may transmit simultaneously such that a particular link may include transmissions from more than one transmitter. For example, assume that transmitters 62, 63, and 64 all transmit simultaneously to transmitter 65 over the links as shown by the heavy lines and arrows in FIG. 2. These transmissions will be received at packet switch 74 and retransmitted over link 87. Typically, only one transmitter transmits at a time, and the appropriate bandwidth to allocate to that transmission or channel is the amount used by a single transmitter. However, if all three transmitters 62, 63, and 64 transmit simultaneously, the bandwidth use on link 87 is three times the single transmitter rate leading to interference with other connections. The present invention detects when a connection uses more than its share of bandwidth and protects other connections in a manner to be described.

The overall structure of the switch module is show in FIG. 3. The switch module 200 illustratively terminates up to N bi-directional fiber optic links 202-1...202-N. Typically N is on the order of 63 and each fiber optic link operates at up to 100 megabits/sec.

The switch fabric 204 is the heart of the switch module 200. The high bit rate optical fiber links 202-1 . . . 202-N interface with the switch fabric 204 by means of packet processors 206-1 . . . 206-N.

Typically, a packet being transmitted over a single point connection enters the switch fabric 204 from one of the fiber optic links via one of the packet processors and leaves the switch fabric through another of the packet processors and associated fiber optic link. A broadcast or multipoint packet enters the switch fabric through one packet processor, is replicated in the switch fabric and leaves via a number of packet processors and associated fiber optic links.

The packet processors perform link level protocol functions including the determination of how each packet is routed through the switch fabric. Routing information is stored in memories contained within each packet processor. The connection processor 208 is responsible for establishing connections including both single point and broadcast connections. To do this the connection processor 208 exchanges control packets with connection processors in neighboring switch modules and controls the routing action of the packet processors and the switch fabric by writing routing information into memory tables contained therein. Illustratively, the connection processor 20S is a stored program machine such as a microprocessor.

Said copending patent application further describes the packet protocol including the format of a data transfer packet and the format of packets after they enter a switch module. Said copending patent application further describes the switch fabric 204 including its timing, routing network, distribution network, copy network, and broadcast and group translators. Except as will be otherwise indicated, these various networks of FIGS. 1 and 3 operate in the manner described in said copending patent application.

Figure 4:
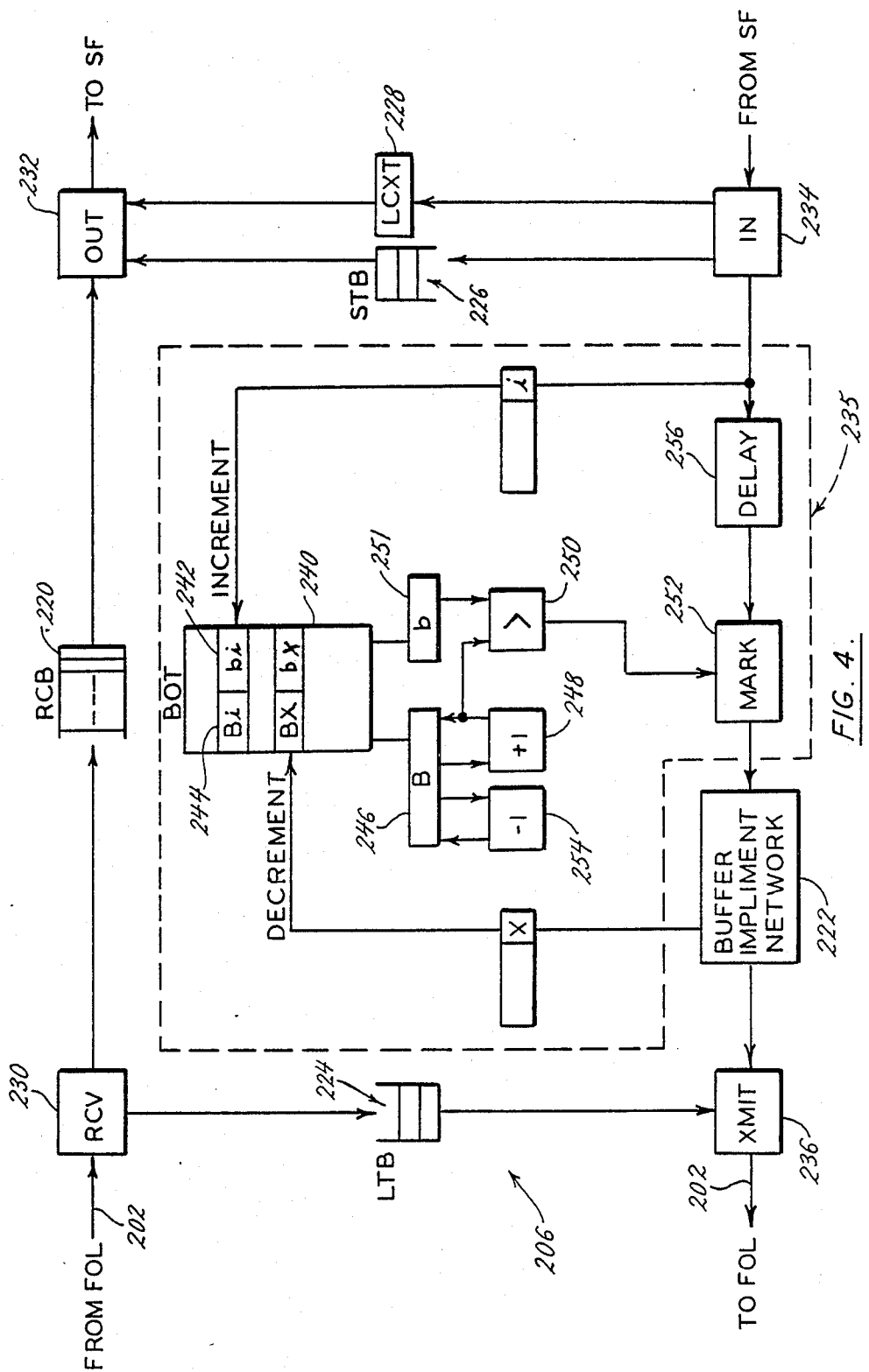
FIG. 4 schematically illustrates a packet processor in accordance with the buffer management system of the present invention for use in the switch module of FIG. 3.

The buffer management system of the present invention is generally illustrated in FIG. 4 of the drawing and is included with each packet processor. It will be noted that the packet processor shown in FIG. 4 of the drawing is similar to the packet processor illustrated in FIG. 5 of said copending patent application except that the packet processor of FIG. 4 includes the buffer management system of the present invention. FIGS. 4 through 10 of the drawings illustrate further detail of this buffer management system.

Hence, referring to FIG. 4 of the drawing, there is shown a typical one of the packet processors 206-1 . . . 206-N. The packet processor 206 serves to interface one of the bi-directional fiber optic links 202-1 . . . 202-N with the switch fabric 204 of FIG. 3.

The packet processor 206 comprises four packet buffers 220, 222, 224, 226. The receive buffer 220 is used for packets arriving on the fiber optic link 202 and waiting to pass through the switch fabric. The transmit buffer (buffer implementation network) 222 buffers packets arriving from the switch fabric 204 that are waiting to be sent out on fiber optic link 202. The link test buffer 224 and switch test buffer 226 provide paths for test packets used to verify the operation of the fiber optic link 202 and switch fabric 204 respectively. The logical channel translation table LCXT 228 is a memory which stores packet routing information as discussed in said copending patent application.

The receive circuit 230 converts the incoming serial optical signal transmitted over the optical fiber link 202 to an electrical signal in an eight bit parallel format, synchronizes the signal to the local clock, routes test packet to the link test buffer 224 and other packets to the receive buffer 220. Advantageously, the eight bit parallel signal format is the signal format used by the switch fabric.

The output circuit 232 takes packets from the receive buffer 220 and uses the LCN contained therein and described in said copending patent application to address the logical channel translation table memory (LCXT) 228. The operations of the output circuit 232 and the LCXT 228 are described in said copending patent application.

The input circuit 234 receives packets from the switch fabric 204 and sends them to the transmit buffer 222 via a packet marking network 235. The input circuit 234 makes certain modifications to the packet protocol as described in said copending patent application and also routes switch fabric test packets through the switch test buffer 226 to the output circuit 232.

The transmit circuit 236 takes packets from the transmit buffer 222, adds a flag, and converts the eight bit parallel electrical signal into a serial optical signal for transmission on the fiber optic link 202. Other operations of the packet processor 206 of FIG. 4 are described in said copending patent application.

The buffer management system of the present invention resides in the packet marking network 235 and the buffer implementation network 222 which will now be described.

As previously explained, in accordance with the invention, before entering the output link buffer 222 each packet is marked or identified as either an excess packet or a nonexcess packet. Excess packets are those from a particular connection (channel) and where the allocated buffer slots for that connection are full. As will be further explained, such excess packets are not simply discarded, but are allowed to enter the buffer for further transmission if buffer slots are available. However, such excess packets are subject to being "bumped" (discarded) under circumstances as will be further explained.

Hence, before entering the output link buffer implementation network 222 each packet is first marked, and this marking is accomplished by the packet marking network 235.

To explain the operation of the packet marking network 235, suppose by way of example a set of connections cl . . . cm, some of which may be multipoint connections, sharing a common transmission link. Each connection ci has an associated rate ri. The common transmission link has a rate R and the memory array of the buffer implementation network 222 has a capacity of B packets. In accordance with a preferred embodiment of the present invention the sums of ri are less than or equal to R. This does not imply that each source transmits at a constant rate of ri, but rather that ri is the amount of link bandwidth reserved for the connection during overload periods. Also in accordance with a preferred embodiment of the invention, bi is the number of buffer slots allocated to a particular connection ci, and is equal to the smallest integer that is greater than or equal to B(ri/R). Hence, the number of buffer slots allocated to a particular connection is directly proportional to the connection's allocated bandwidth during overload periods. One way of determining the value of ri for a particular connection is described in a thesis entitled "Congestion Control in a Fast Packet Switching Network" by Shahid Akhtar, December 1987, Washington University Sever Institute of Technology.

An overload occurs when the memory array of the buffer implementation network overflows, and this occurs during overload periods. An objective of the invention is to discard packets selectively so that ideally only connections ci using more than their allocated slots of the buffer implementation network are affected by the overload. To accomplish this objective each packet entering the buffer implementation network is first marked as either an excess packet or a nonexcess packet by the packet marking network 235. This network includes a buffer occupancy table 240 that contains an entry for each connection. The entry for connection ci consists of two fields, one field 242 containing bi which is the number of buffer slots allocated to connection ci, and another field 244 containing Bi which is the number of buffer slots currently being used by connection ci.

Whenever a packet on a particular connection ci is received, the corresponding table entry for that connection is read and Bi is incremented and then written back into memory as depicted at 246 and 248. If Bi is greater than bi as indicted by the comparator 250, 251, the packet is marked as an "excess packet" at a network 252, which means that it may be discarded if an overload occurs in the buffer implementation network. When a packet on a particular connection ci is removed from the buffer implementation network, either because it is transmitted to the transmit circuit 236 and onto the fiber optic output link or because it is discarded due to overload, Bi is decremented as shown at 254. The packet marking network also includes a delay circuit 256 to delay the transmission of the packet to the buffer implementation network to allow for the marking of the packet.

Hence, the buffer occupancy table 240 maintains a current status for each connection of the number of packets stored in the buffer implementation network for the particular connection and the number of buffer slots allocated to that connection. Unless, for a given connection, the number of packets stored in the buffer implementation network is less than the allocated number for that connection, an incoming packet on that connection will be marked as an "excess packet".

After each packet is marked as either an excess packet or a nonexcess packet, the buffer management system determines whether and under what circumstances the packet is transmitted to the output link 202. This determination is made by the buffer implementation network 222 which will now be described.

Figure 5:
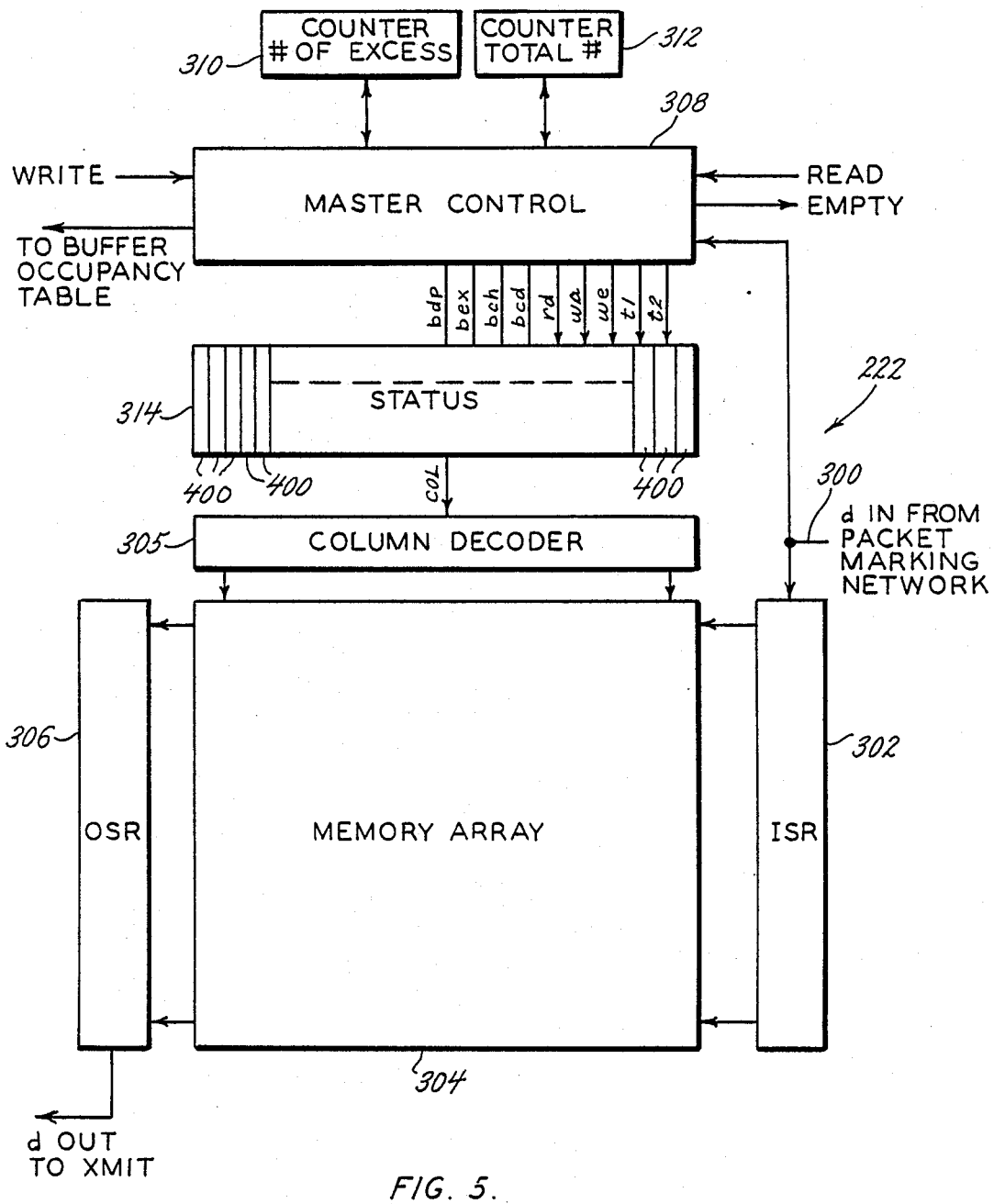
FIG. 5 is a block diagram of a buffer implementation network used in the packet processor of FIG. 4.

The buffer implementation network 222 is more particularly shown in FIG. 5. Incoming packets from the packet marking network 235 and which have been marked as either excess or nonexcess packets enter at 300 and pass through an input shift register 302 before being strobed into a memory array 304, which may be a RAM, by a column decoder 305. In one form of the invention each packet may occupy one full column of the memory array, although this is not essential. Packets exit the memory array via an output shift register 306 for transmission on the fiber optic output cable 202 via the transmit circuit 236 (FIG. 4). A master control circuit 308 provides global control logic and timing for the network 222. The memory array 304 operates on a fixed timing cycle. Each timing cycle can include both the reading of a packet and the writing of another packet. A counter 310 keeps a status count of the number of excess packets in memory, and a counter 312 keeps a status of the total number of packets in memory. A status block 314 maintains information about the packets stored in each column of the memory array, and controls the writing to and reading from the memory array in accordance with the criteria of the present invention. Hence, the status block insures that the following conditions are met:

- If an incoming packet is marked excess and the memory array is not full, then the packet is written to an available column in the memory array.
- If an incoming packet is marked excess and the memory array is full, the incoming packet is not written into the memory array but instead is discarded.
- If an incoming packet is marked a nonexcess packet and the memory array is not full, the incoming packet is written to an available column.
- If an incoming packet is marked a nonexcess packet and the memory array is full and includes at least one excess packet in memory, the incoming packet is written to the column of the last in excess packet and this excess packet in memory is "bumped", that is, discarded.
- If the buffer is full with no excess packets, any incoming packet is discarded.

Hence, nonexcess packets are protected. A nonexcess packet overwrites an excess packet when the memory array is full. If an excess packet arrives when the array is full, it is discarded so that an arriving excess packet cannot overwrite an excess packet in memory. Also, excess packets in memory are overwritten in last in - first out (LIFO) order so that the last in excess packets have the lowest priority.

The status block comprises a one dimensional array of control slices 400 with each control slice corresponding to a column of memory in the memory array 4. Each slice contains a "control word" consisting of a column number (COL) which identifies the column in the memory array controlled by the slice, a data present bit (DP) which is set to a 1 if the column contains a packet, an excess bit (EX) which is set to a 1 if the packet in the column is an excess packet, and a channel number (CH) which identifies the channel or connection that the packet belongs to. See the top status frame of FIG. 6.

The control slices are maintained in FIFO order. That is, the column number COL shown in the first control slice, which is the right most control slice in the status frames of FIG. 6, is the column number in the memory array from which the first packet is read from memory. Similarly, the column number (COL) of the second control slice from the right is the column number in the memory array from which the second packet is read from memory. When a packet is read from the memory array, the control slices shift to the right, that is, each control slice copies its left neighbor's control word. In other words, the contents of the DP, EX, CH, and COL registers in the status block shift to the right as viewed in FIG. 6.

There are two kinds of write operations. If the memory array is not yet full, the incoming packet is written into the column controlled by the control slice in the status block which is the right most control slice for which the DP bit is 0, the 0 meaning that there is no packet in the array column corresponding to that control slice. This is accomplished by in effect scanning the control slices from right to left until the first control slice meeting this condition is found. The column number identified by that control slice is then output by the status block to the column decoder which uses that column number identification to select the column of the memory array into which the incoming packet is to be written.

In accordance with a second write operation, where the buffer is full, and assuming the incoming packet is a nonexcess packet, the incoming packet is written to the column of the memory array controlled by the left most control slice for which both the DP and EX bits are set to 1, meaning that there is an excess packet in the column of the memory array associated with that control slice. It should be remembered that this control slice represents the "last in" excess packet and the one that is to be "bumped" if the memory array is full and there is an incoming nonexcess packet. This is again accomplished by scanning the control slices, this time from left to right, until finding the control slice that meets this condition. The column number of this slice is used by the column decoder to select the column of the memory array into which the incoming nonexcess packet is to be written. The excess packet previously stored at that column is "bumped" (discarded).

Although, when the memory array is full, it is the left most control slice having both the DP and EX bits set to 1 that determines the column into which the entering packet is written, the information (control word) for the incoming packet must actually be placed in the extreme left control slice in the status block. Thus, if the left most control slice having both DP and EX bits set to 1 is not the extreme left control slice, then all of the control slices to the left of that left most control slice must shift one slice to the right, while the contents of that left most slice is moved to the extreme left end of the status block. This operation produces the column number of the memory array controlled by that control slice as an output to the column decoder, and also produces the channel number of the packet originally written in that control slice which is used to update the table 240 of FIG. 3 that tracks the number of packets each channel (connection) has in the memory array.

FIG. 6 shows an example of several read and write operations performed by the buffer implementation network 222. For illustration only the status block is shown with eight control slices which control a memory array with eight slots. The figure illustrates five frames of the status block and memory array to illustrate four read/write operations from top to bottom. Each frame of the status block shows to its right a corresponding frame in the memory array. While eight control slices and eight slots or columns are shown, it is to be understood that this is by way of example only and that realistically the status block and memory array might have 64 slices and slots, although it could be a fewer or greater number.

The top frames of the figure illustrate what might be an initial configuration for purposes of explanation. The DP bits are set to 1 for slices 0 through 6 indicating that there are packets in the columns of the memory array associated with those slices. The DP bit in column 7 is set to 0 so that there is no packet in the memory array column corresponding to slice 7. The EX bits are set to 1 in slices 4 and 6 meaning that the packets in the column (columns 0 and 7 respectively) of the memory array corresponding to slices 4 and 6 are excess packets. The channel and column numbers are also identified in each slice. Hence, to illustrate, control slice 0 controls column 3 of the memory array which contains a packet on channel 17. Slice 1 of the status block controls column 6 of the memory array which includes a packet on channel 12, and so on to slice 7 which controls column 2 of the memory array which contains no packet.

First, a read operation is explained with reference to frames 1 and 2. As previously explained, packets are read out of memory from the right most control slice (slice 0). Hence, the packet on channel 17 at column 3 is read out of memory leaving no packet at column 3 of the memory array as shown at the second frame. All of the control slices to the left of slice 0 move one slice to the right as shown by the second frame of the status block with the control slice at the extreme left taking on the column identifier (3) that had been in slice 0 and showing no packet in that column as the packet has been read out of memory. As a packet has now been read out of the memory array there is now an additional slot or column in the memory array available for an incoming packet. Hence, the read operation produces as output to the master control and column decoder the channel number of the packet being read from memory plus the number of the column it is being read from.

Frames 3 and 4 illustrate two successive write operations where the memory array is not full so that it is of no consequence whether the incoming packet is an excess packet. As previously explained, each write operation will write to the first available slice (where the DP bit is 0) from the right. Referring to frame 2 of the status block, this is slice 6. For example, assuming the incoming packet is on channel 15, it is written into slice 6 which controls column 2 of the memory array. Hence, the packet is written into column 2 of the memory array as shown in frame 3. Assume another entering packet on channel 12. This packet will be written into the next available slice which is slice 7 which controls column 3 of the memory array. Hence, the incoming packet on channel 12 will be written into column 3 of the memory array, all as shown at frame 4. Note that frame 4 illustrates a full condition of the memory array with all memory slots containing packets. Note also that the memory slots of columns 0 and 7 of the memory array contain excess packets as shown by slices 3 and 5 respectively (see frame 4).

The last frame illustrates a write operation where the memory array is full as shown by the fourth frame and the incoming packet is a nonexcess packet. It should be remembered that when a memory array is full and the incoming packet is an excess packet, the incoming packet is not written into memory but instead is discarded. Hence, referring to frames 4 and 5, assume that the incoming packet is a nonexcess packet on channel 18. As previously explained, under these conditions the incoming nonexcess packet will be written into the control slice which is the first control slice from the left with the EX bit set to 1. This is the control slice with its excess bit set to 1 and that represents the last in excess packet. This is control slice 5. Hence, the new incoming packet on channel 18 is written into the column of the memory array controlled by control slice 5 of the status block. In other words, it is written into column 7 as shown by frame 4 of the status block and frame 5 of the memory array. Also, as previously explained, the control word information in the control columns 6 and 7 to the left of column 5 is transferred one slice to the right with the control word for the incoming packet being written into the left most control slice (7), all as shown in frame 5 of the status block. Therefore, in comparing frames 4 and 5 of the status block of FIG. 5, the column identification in slice 5 of frame 4 (column 7) becomes the column identification of slice 7 in frame 5, and the remainder of the control word in slice 7 of frame 5 of the status block indicates that there is a nonexcess packet on channel 18 stored at column 7 of the memory array. In the event of another incoming nonexcess packet, this new packet would be written into the column of the memory array controlled by control slice 3 of the status block (frame 5) as this is the first control slice from the left with the EX bit set to 1. The process for writing this new packet into memory would be the same as just previously described.

It is to be understood that at start up the buffer implementation network is initialized to clear all the DP bits and set the COL registers to distinct column numbers. This may be accomplished by connecting a suitable counter to the bcol bus lines (FIG. 7) during initialization and successively loading each of the control slices from this counter as it is incremented through a range of values. This would require additional multiplexers on the inputs of the COL registers. After the system has been operating to process packets, each control slice will retain a column identification whether or not there are actually packets in the columns associated with those control slices. It is only when the system has been turned off and then turned back on that such initialization is required.

Whenever a packet leaves the buffer implementation network, whether because it is transmitted or because it is bumped, the channel information of the packet is output from the master control 308 of the buffer implementation network 222 to the buffer occupancy table 240 as shown in FIG. 3 by the "decrement" output. This updates the buffer occupancy table so that further incoming packets on that channel are correctly marked either excess or nonexcess packets.

Figure 7:
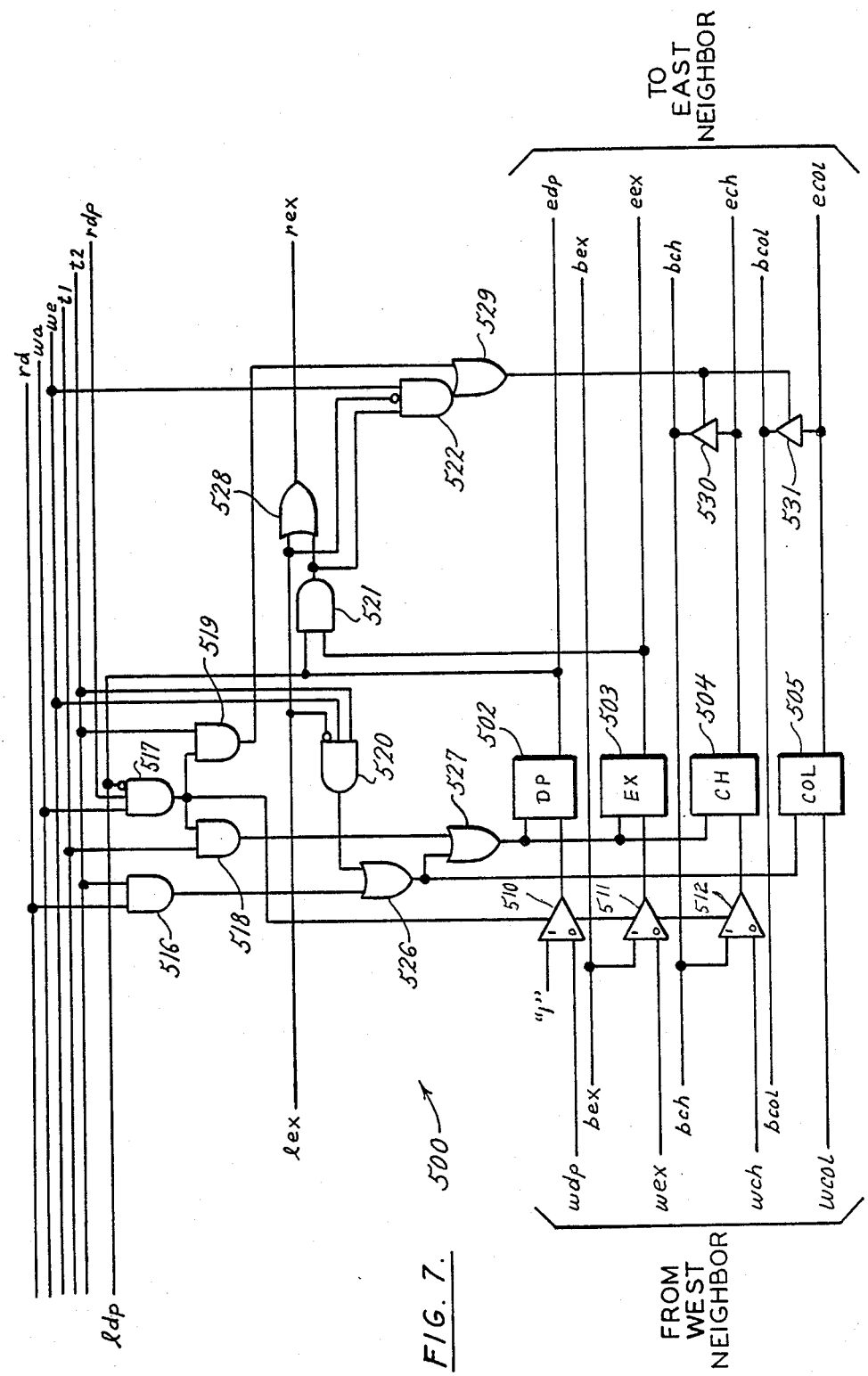
FIG. 7 is a schematic diagram of a typical intermediate control slice in the buffer implementation network of FIG. 5.
Figure 9:
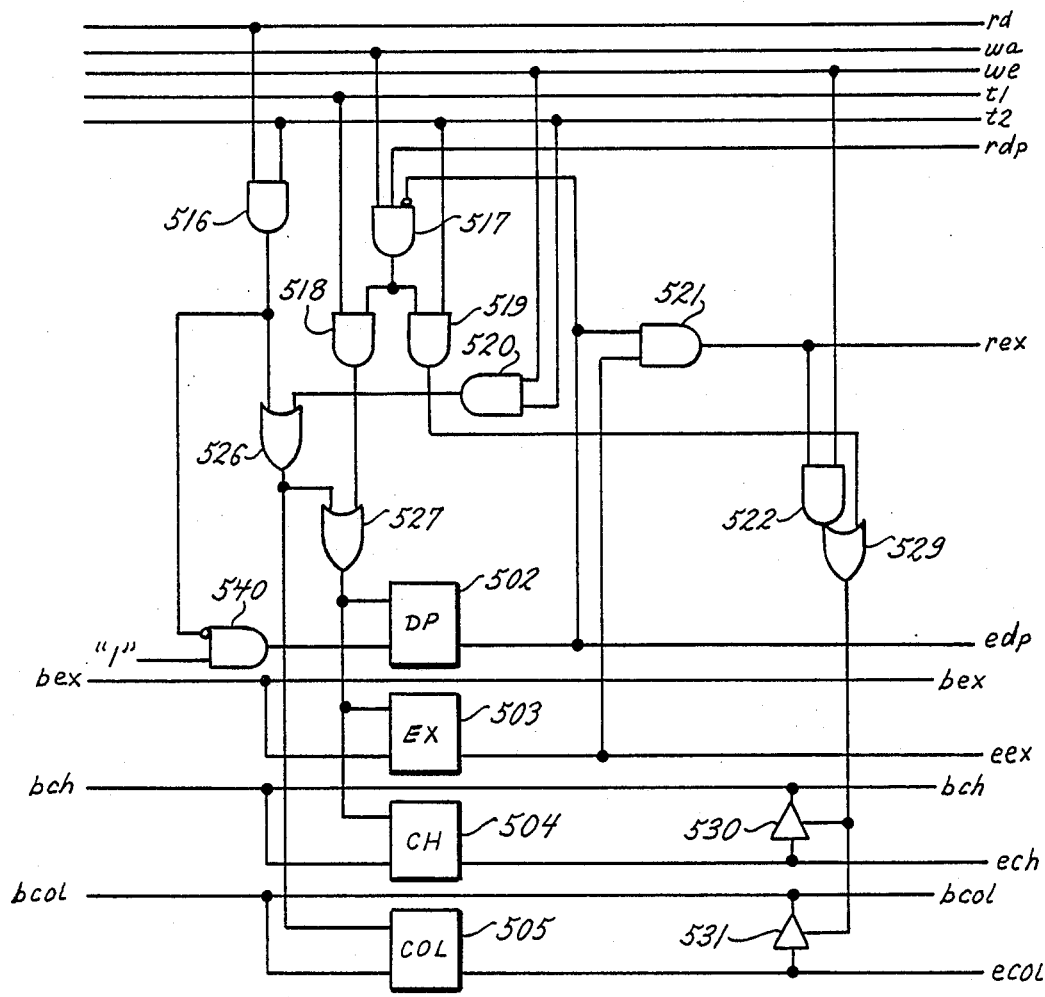
FIG. 9 is a schematic diagram of the left most control slice in the buffer implementation network of FIG. 5.
Figure 10:
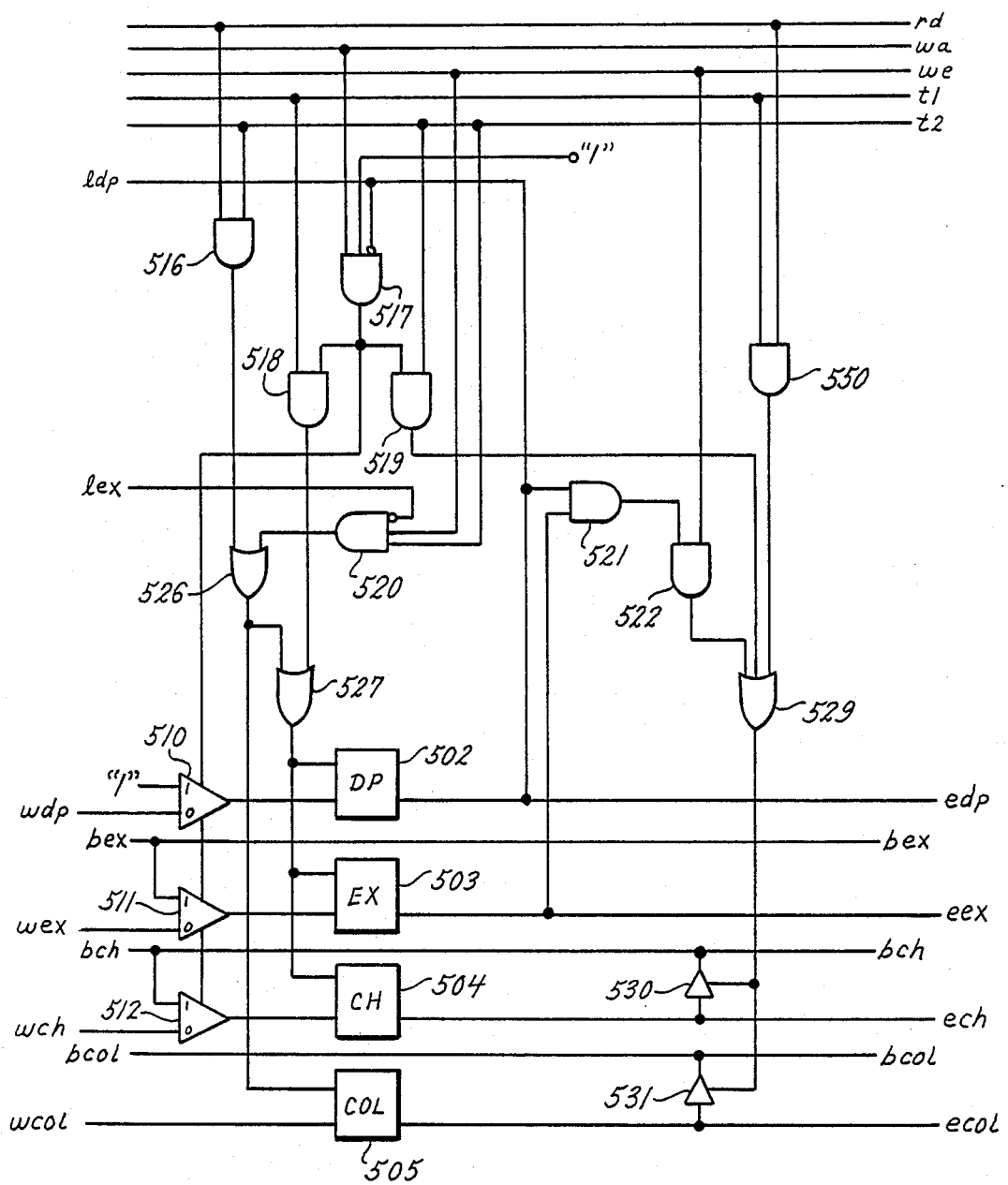
FIG. 10 is a schematic diagram of the right most control slice in the buffer implementation network of FIG. 5.

The circuitry 500 for a typical one of the control slices 1 through 6 is shown in FIG. 7. The circuitry for control slices 0 and 7 are somewhat different and are shown in FIGS. 9 and 10. The circuitry includes registers 502-505 corresponding to the DP, EX, CH, and COL identifications in FIG. 6. The circuitry also includes multiplexers 510 through 512 at inputs of the registers 502 through 504 respectively. The circuit further includes a gate network with AND gates 516 through 522, OR gates 526 through 529 and tristate buffers 530 and 531.

A set of global bus lines runs through all the control slices. These are the lines marked bex, bch and bcol. In addition, each register has lines connecting it to like registers in the control slices directly to the left (west neighbor) and directly to the right (east neighbor). These lines are designated wdp, wex, wch and wcol for the connections to the west, and edp, eex, ech, and ecol for the connections to the east. The EX and CH and 512 which allow them to be loaded either from the neighbor to the west o from the bus lines. The DP register 502 is preceded by the multiplexer 510 which allows it to be loaded either from the neighbor to the west or to a line carrying a 1 bit. The tristate buffers 530 and 531 allow the contents of the CH and COL registers to be placed on the bus lines in addition to be passed to like registers in the neighbor to the east.

Figure 8:
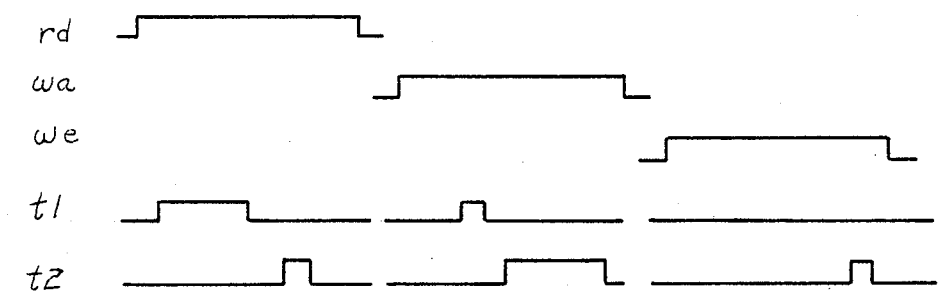
FIG. 8 illustrates the timing signals used with the control slice circuits.

The primary control signals for controlling the circuit of FIG. 7 are shown in FIG. 8. It will be noted that the nomenclature for the connections at the top of the circuit in FIG. 7 correspond to the nomenclature for the signals in FIG. 8. The rd signal is high during "read" operation a previously explained with respect to frames 1 and 2 of FIG. 6. The wa signal is high during a "write to available column operation" which was previously described with respect to frames 2 and 3 and also with respect to frames 3 and 4 of FIG. 6. The we signal is high during a "write to excess column operation" as previously explained with respect to frames 4 and 5 of FIG. 6. The timing signals t1 and t2 are used to control the precise timing of various actions during the three operations. In addition, the control leads ldp and rdp in FIG. 7 allow each slice to monitor the DP bit of its east neighbor, and the lex and rex leads allow each slice to determine if any of the slices to the west of it has its excess bit set to 1.

During a "read" operation, such as previously explained with respect to frames 1 and 2 of FIG. 6, each control slice stores the contents of its west neighbor's control word, affecting a shift right by one control slice of the entire status block. This is due to the fact that a packet is read out of the extreme right control slice as previously explained. More specifically, when the rd and t2 signals are both high, the AND gate 516 and OR gates 526 and 527 are enabled to shift the control word from the west neighbor to the registers 502 to 505.

During a "write to available column operation", such as explained with reference to frames 2 to 4 of FIG. 5, the incoming packet is to be written into the first control slice from the right having its DP bit equal to 0. More specifically, the first control slice from the right with its DP bit equal to 0 is identified when there is a 1 on the rdp line and a 0 on the ldp line. Under these conditions and with a high on the wa line and t1, the AND gate 517 is enabled to place a 1 at the output of the multiplexer 510 and the information on the bex and bch bus lines at the outputs of the multiplexers 511 and 512, respectively. Also, AND gate 518 is enabled to transfer the information at the outputs of the multiplexers to the registers 502 through 504. Hence, the appropriate control slice is loaded with the EX and CH information on the incoming packet. When t2 goes high, gates 519 and 529 are enabled to gate the information on the CH and COL registers 504 and 505 through the tristate buffers 530 and 531 to the bch and bcol bus lines, so that the column number can be used to control the writing of the packet into the proper memory column of the memory array.

During a "write to excess column operation", such as explained with reference to frames 4 and 5 of FIG. 6, the control word for the incoming nonexcess packet is written into the control slice representing the last in excess packet. This control slice is identified as having its EX bit set to 1 and where the EX bits in all of the control slices to its west are set to 0. When this condition is met, the signal on lex is a 0. If there is any control slice to the left with its EX bit set to 1, the signal on lex is a 1. For example, assuming that a control slice to the left has its EX bit set to 1, the AND gate 521 and OR gate 52S of that slice will be enabled to produce a 1 on the rex line of that control slice, and hence the lex line of the control slices to its right.

Therefore, assuming a 0 on the lex line, when the we and t2 signals go high, the AND gate 520 and OR gates 526 and 527 are enabled so that the control word of the control slice immediately to the west is shifted to the registers 502 to 505. Also, with the DP and EX bits set at 1s, the AND gates 521 and 522 and the OR gate 529 are enabled to gate the CH and COL registers to the bch and bcol bus lines representing the channel information of the excess packet and the column identifier for the incoming packet. As previously explained, the channel number on bch is then used to update the buffer occupancy table 240 in FIG. 4, and the column number information on bcol is used to control the writing of the incoming packet to the proper column of the memory array. Also, all control slices to the west of the identified control slice (the one representing the last in excess packet) affect a control word shift to the right.

The control slice 7 at the extreme left of the status block is shown in FIG. 9. It will be noted that the circuit of FIG. 9 is similar to that of FIG. 7 except that there is no gate 528 or lex input, there is no ldp output, and there is an additional AND gate 540 at the input of the DP register 502. During a "read" operation, the circuit of FIG. 9 clears its DP register 502 to 0 by operation of the AND ga e 540, and loads its COL register 505 from the bcol line to load the column number from the extreme right slice. Otherwise, during a "read" operation it functions the same as the circuit of FIG. 7.

During both a "write to available column operation" and a "write to excess column operation", the circuit of FIG. 9 functions in the same manner as the circuit of FIG. 7.

The control slice 0 at the extreme right of the status block is shown by the circuit of FIG. 10. This circuit is similar to that of FIG. 7 with the following exceptions: an AND gate 550 has been added at the input of the OR gate 529; the OR gate 528 and rex output are deleted; and what is the rdp input in FIG. 7 is an input set to 1 in FIG. 10. During a "read" operation the COL information from the register 505 is placed in the bcol bus to be picked up by the circuit of FIG. 9 for the extreme left control slice. Otherwise, during a "read" operation, the circuit of FIG. 10 operates in the same way as the circuit of FIG. 7. Also, with the 1 input to the AND gate 517 of FIG. 10 simulating a 1 condition on the rdp input to the AND gate 517 of FIG. 7, the circuit of FIG. 10 also operates the same a the circuit of FIG. 7 during a "write to available column operation", as well as during a "write to excess column operation".

It should be noted that incoming packets are marked as excess or nonexcess on entry to the buffer implementation network and may be discarded sometime later even though in the meantime the channel to which the packet belongs is no longer using more than its allocation of the buffer. This is one preferred approach in that once a packet is marked "excess" it is reasonable to consider it vulnerable to being discarded. Another preferred approach is to discard packets only from connections using more than their allocation at the time of overload. The network heretofore described is easily modified to implement this other approach. This is accomplished by modifying the read operation so that when a packet is read from the network 222, the last in excess packet with the same channel number as the packet being read clears its EX bit to 0. Every control slice would have a comparator that compares the contents of its CH register with the bch bus line. An additional control signal would then be generated to identify the control slice representing the last in excess packet with the given channel number. These are straightforward extensions to the circuitry heretofore described.

Hence, there has been described a buffer management system wherein the selection of packets for transmission during overload is controlled to provide efficient use of buffer storage while protecting those connections or channels operating within their allocated bandwidths.

There are various changes and modifications which may be made to the invention as would be apparent to those skilled in the art. However, these changes or modifications are included in the teaching of the disclosure and it is intended that the invention be limited only by the scope of the claims appended hereto.

What is claimed is:

1. In a general multipoint packet switching network having terminals transmitting data in the form of packets belonging to multiple channels over communication links through a packet switch array, and where the packet switches of the array have means for receiving incoming packets from input data links and memory arrays for temporarily storing said incoming packets for retransmitting said stored packets over output links, a management system for determining whether a packet should be stored, retransmitted, or discarded during an overload condition, said management system comprising:

means for allocating a predetermined amount of memory in a memory array for the packets for each channel;

means for identifying each incoming packet as either an excess packet or a nonexcessive packet based on a comparison of the number of packets of the same channel as the incoming packet stored in the memory array and the amount of memory allocated to the packets of said channel in the memory array;

means for writing an incoming packet into said memory array if said memory array is not full whether or not the incoming packet is an excess or nonexcess packet; and means for writing an incoming nonexcess packet into said memory array when said memory array is full and at least one excess packet is in said memory array and for discarding said excess packet from said memory array.

2. The system of claim 1 further comprising means for identifying an incoming packet as an excess packet where the amount of memory allocated for packets of the channel of the incoming packet is full.

3. The system of claim 1 wherein said excess packet discarded from memory is the last in excess packet written into said memory.

4. The system of claim 1 further comprising means for discarding an incoming excess packet when said memory array is full without writing said incoming excess packet into memory.

5. The system of claim 1 further comprising means for maintaining information on each packet in said memory array, said information including identification of the channel of said packet, identification of the location in memory where the packet is stored, and identification of the packet as being either an excess or a nonexcess packet.

6. The system of claim 1 further comprising control means for controlling the reading and writing of packets out of and into said memory array, said control means further comprising control slices, a control slice for each location in the memory array for storing a packet, each control slice including information identifying:

(a) whether a packet is stored in the memory location corresponding to said control slice;

(b) whether a packet stored in the memory location corresponding to said control slice is an excess or nonexcess packet;

(c) the memory location to which the control slice corresponds; and (d) the channel of the packet stored in the memory location corresponding to said control slice; said control means controlling the reading and writing of packets out of and into said memory array in response to said information in said control slices.

7. The system of claim 1 further comprising means for reading packets out of the memory array in a first in - first out order.

8. In as general multipoint packet switching network having terminals transmitting data in the form of packets belonging to multiple channels over communication links through a packet switch array, and where the packet switches of the array have means for receiving incoming packets from input data links and memory arrays for temporarily storing said incoming packets for retransmitting said stored packets over output links, a management system for determining whether a packet should be stored, retransmitted, or discarded during an overload condition, said management system comprising:

means for identifying each incoming packet as either an excess packet or a nonexcess packet based on the number of packets of the same channel as the incoming packet stored in a memory array; and means for writing an incoming nonexcess packet into said memory array when said memory array is full and at least one excess packet is in said memory array and for discarding said excess packet from said memory array.

9. The system of claim 8 further comprising means for writing an incoming packet into said memory array if said memory array is not full whether or not the incoming packet is an excess or nonexcess packet.

10. The system of claim 8 further comprising means for identifying an incoming packet as an excess packet where the amount of memory allocated for packets of the channel of the incoming packet is full.

11. The system of claim 10 wherein said excess packet discarded from memory is the last in excess packet written into said memory.

12. In a general multipoint packet switching network having terminals transmitting data in the form of packets belonging to multiple channels over communication links through a packet switch array, and where the packet switches of the array have means for receiving incoming packets from input data links and memory arrays for temporarily storing said incoming packets for retransmitting said stored packets over output links, a management system for determining whether a packet should be stored, retransmitted, or discarded during an overload condition, said management system comprising:

means for allocating a predetermined amount of memory in a memory array for the packets of each channel;

means for identifying each incoming packet as either an excess packet or a nonexcess packet based on a comparison of the number of packets of the same channel as the incoming packet stored in the memory array and the amount of memory allocated to the packets of said channel in the memory array;

control means for controlling the reading and writing of packets out of and into said memory array, said control means further comprising control slices, a control slice for each location in the memory array for storing packets, each control slice including information identifying;

(a) whether a packet is stored in the memory location corresponding to said control slice;

(b) whether a packet stored in the memory location corresponding to said control slice is an excess or nonexcess packet;

(c) the memory location to which the control slice corresponds; and (d) the channel of the packet stored in the memory location corresponding to said control slice;

said control means further comprising means controlling the reading and writing of packets out of and into said memory array in response to said information in said control slices, means for writing an incoming packet into said memory array if said memory array is not full whether or not the incoming packet is an excess or nonexcess packet, and means for writing an incoming nonexcess packet into said memory array when said memory array is full and at least one excess packet is in said memory array and for discarding said excess packet from said memory array.

13. The system of claim 12 further comprising means for identifying an incoming packet as an excess packet where the amount of memory allocated for packets of the channel of the incoming packet is full.

14. The system of claim 13 wherein said excess packet discarded from memory is the last in excess packet written into said memory.

15. The system of claim 14 further comprising means for discarding an incoming excess packet when said memory array is full without writing said incoming excess packet into memory.

16. The system of claim 15 further comprising means for reading packets out of the memory array in a first in - first out order.

* * * * *